US009061636B2

(12) United States Patent
Hasegawa et al.

(10) Patent No.: US 9,061,636 B2
(45) Date of Patent: Jun. 23, 2015

(54) VEHICLE FRONT STRUCTURE

(71) Applicant: Fuji Jukogyo Kabushiki Kaisha, Tokyo (JP)

(72) Inventors: Masami Hasegawa, Tokyo (JP); Hiroshi Suemune, Tokyo (JP); Kazutoshi Hatsusaki, Tokyo (JP); Kazuhiro Oota, Tokyo (JP); Takashi Suzuki, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/025,139

(22) Filed: Sep. 12, 2013

(65) Prior Publication Data

US 2014/0084608 A1   Mar. 27, 2014

(30) Foreign Application Priority Data

Sep. 27, 2012 (JP) ................... 2012-214660

(51) Int. Cl.
*B60R 19/18* (2006.01)
*B60R 19/12* (2006.01)
*B60R 19/48* (2006.01)

(52) U.S. Cl.
CPC ................ *B60R 19/18* (2013.01); *B60R 19/12* (2013.01); *B60R 19/48* (2013.01); *B60R 2019/486* (2013.01)

(58) Field of Classification Search
CPC ....... B60R 19/18; B60R 21/34; B62D 25/082
USPC .............. 293/132, 120, 104, 145; 296/187.09
See application file for complete search history.

(56) References Cited

U.S. PATENT DOCUMENTS 6,997,490 B2 *   2/2006   Evans et al. ................... 293/120
8,523,251 B1 *   9/2013   Fortin et al. ................... 293/132

FOREIGN PATENT DOCUMENTS

| JP | 10-218022 | 8/1998 |
|---|---|---|
| JP | 2006-193078 | 7/2006 |
| JP | 2006-347372 | 12/2006 |
| JP | 2010-006238 | 1/2010 |
| JP | 2012-148613 | 1/2012 |
| JP | 2012-148613 A | 8/2012 |

* cited by examiner

*Primary Examiner* — Glenn Dayoan
*Assistant Examiner* — Dana Ivey
(74) *Attorney, Agent, or Firm* — Smith, Gambrell & Russell, LLP

(57) ABSTRACT

A front vehicle structure includes: a bumper fascia; a radiator panel upper disposed in a vehicle width direction behind the bumper fascia; and an upper energy absorbing (EA) member for pedestrian protection. The upper EA member is provided in the vehicle width direction in a substantially Σ shape as a side view between the top of the bumper fascia and the radiator panel upper. A rear of the upper EA member for pedestrian protection is fixed to the radiator panel upper. An upper projection and a lower projection are respectively formed above and below the upper EA member.

20 Claims, 10 Drawing Sheets

VEHICLE FRONT STRUCTURE

CROSS-REFERENCE TO RELATED APPLICATIONS

The present application claims priority from Japanese Patent Application No. 2012-214660 filed on Sep. 27, 2012, the entire contents of which are hereby incorporated by reference.

BACKGROUND

1. Technical Field

The present invention relates to vehicle front structures in which an energy absorbing member for pedestrian protection is interposed upward between a bumper fascia and a front rigid body disposed behind the bumper fascia.

2. Related Art

A conventional front end disposed in front of an engine compartment is provided with a radiator panel which holds a heat exchanger such as a radiator and a capacitor of an air conditioner. The front of the radiator panel is covered with a front bumper fascia.

The heat exchanger such as the radiator and the capacitor is expensive, and thus a technology is used which prevents damage to front rigid bodies such as the heat exchanger and the radiator panel. In the technology, an energy absorbing space is provided between a heat exchanger and the bumper fascia, and an energy absorbing member is disposed on the front face of a bumper beam which is disposed in the energy absorbing space, so that in the case of a collision at a low speed (light collision) with an object such as a preceding vehicle or a utility pole, an impact energy is absorbed by deformation of the energy absorbing member only.

In such a vehicle having a collision energy absorbing space at the front thereof, the radiator panel is inevitably disposed at a position spaced apart rearward from the front end of the front bumper fascia by a predetermined distance. For example, in the case of a nose cone front bumper fascia which widely covers the front part of a vehicle in the vehicle width and vertical directions, the upper end of the front bumper fascia is difficult to be directly fixed to the radiator panel, and so is fixed thereto via a bracket or the like.

On the other hand, when the front face of a vehicle collides with a leg of a pedestrian, the upper body of the pedestrian is bent over a front hood which covers the top of an engine compartment, and thus the head of the pedestrian falls on the front hood. In order to absorb the impact energy from the head by deformation of the front hood, it is necessary to ensure the space for allowing the deformation stroke of the front hood. In this case, the front end of the front hood downwardly faces the upper frame of the radiator panel. Because the upper frame is a rigid body, the space for the deformation stroke needs to be ensured between the upper frame and the front hood.

For example, Japanese Unexamined Patent Application Publication (JP-A) No. 2012-148613 discloses a technology for fixing the front hood and the bumper fascia to the upper frame (bulk head) of the radiator panel with the energy absorbing space ensured. Specifically, the hood inner panel (hood frame) provided at the front end of the front hood is extended in the direction of the upper frame of the radiator panel, a hood locking mechanism is provided between the hood inner panel and the upper frame of the radiator panel (hereinafter referred to as the radiator panel upper), and the upper end of the bumper fascia and the radiator panel upper are connected continuously to each other by a plate-like bracket made of synthetic resin.

With the technology disclosed in JP-A No. 2012-148613, when the front face of a vehicle collides with a pedestrian's leg, the collision impact from the front is absorbed by backward bending of the plate-like bracket, and the impact of falling of the head from a front upward position is absorbed by crushing of a box shaped impact absorber which is provided in the plate-like bracket.

By the way, the impact load from the leg is preferably received as a surface load (uniformly distributed load) in order to efficiently absorb the impact energy when a collision with a pedestrian's leg occurs. The technology disclosed in JP-A No. 2012-148613 is designed to absorb the impact energy by crushing of the plate-like bracket, and thus the impact load can be received as a surface load by initially ensuring a large area of the plate-like bracket for receiving the impact load.

However, trying to ensure a large area of the plate-like bracket for receiving the impact load causes part of the area to be overlapped with the radiator panel, whereby the heat exchange performance of the heat exchanger is reduced.

SUMMARY OF THE INVENTION

In view of the above-described situation, it is an object of the present invention to provide a vehicle front structure which can receive and absorb an impact load from a pedestrian's leg as a large surface load without reducing the heat exchange performance of a heat exchanger.

An aspect of the present invention provides a vehicle front structure including: a bumper fascia; a front rigid body disposed in a vehicle width direction behind the bumper fascia; and an energy absorbing member for pedestrian protection which is placed upward between the bumper fascia and the front rigid body in the vehicle width direction, the energy absorbing member for pedestrian protection having a rear fixed to the front rigid body. A bend is formed in the vehicle width direction on a front wall of the energy absorbing member for pedestrian protection, the front wall facing the bumper fascia, the bend being bent in a recessed shape in a vertical direction. An upper projection and a lower projection are respectively formed above and below the bend and project in a direction toward the bumper fascia. Thus, when the impact load from a pedestrian's leg is applied to the energy absorbing member for pedestrian protection, the upper projection and the lower projection of the energy absorbing member for pedestrian protection are pressed, the bend receives a moment load due to the pressing force of both projections and is expanded and deformed upward and downward, and thus the impact load from the leg can be received as a surface load. Since the bend is normally bent in a recessed shape and accordingly the span between the upper projection and the lower projection is short, the front rigid body is not widely covered by the energy absorbing member for pedestrian protection. Thus, when the front rigid body is a heat exchanger, the heat exchange performance is not reduced.

DETAILED DESCRIPTION

Figure 1:
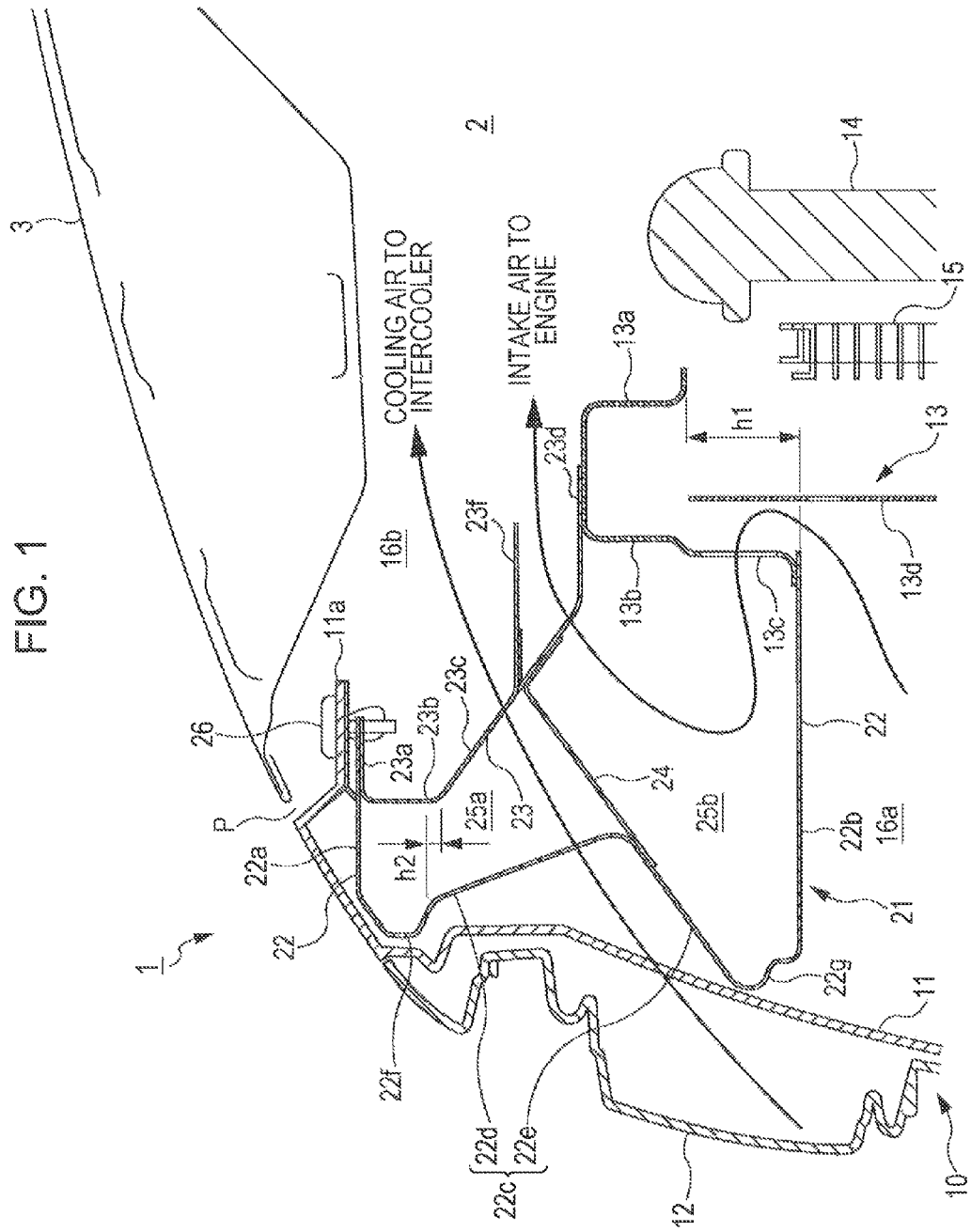
FIG. 1 is a side view of the main part of the front part of a vehicle according to a first example.

Hereinafter, examples of the present invention will be described with reference to the drawings.

FIRST EXAMPLE

FIGS. 1 to 9 illustrate a first example of the present invention. A reference symbol 1 in FIG. 1 indicates the front part of a vehicle. An engine compartment 2 is formed in the vehicle front part 1, and the top of the engine compartment 2 is closed by an operable front hood 3. The front end of the vehicle front part 1 is provided with a front bumper 10. The front bumper 10 has a bumper fascia 11, a bumper beam (not illustrated), and an EA (energy absorbing) member (not illustrated). The bumper fascia 11 is formed with an elastic material such as synthetic resin, and serves as part of the modeled surface of the front end of the vehicle body. In this example, a nose cone front bumper fascia is used which widely covers the front face of the vehicle in the vehicle width and vertical directions.

At the upper end of the bumper fascia 11, there is formed a step 11a which forms a boundary P with the end of the front hood 3. In addition, the upper front face of the bumper fascia 11 has an opening where a front grille 12 is mounted that introduces open air from the front to the engine compartment 2. A radiator panel 13 is disposed in the vehicle width direction at the front end which is at the front of the engine compartment 2. A radiator 14 and a capacitor 15 of an air conditioner are fixedly disposed at the rear of the radiator panel 13, as heat exchangers. The radiator panel 13 and the heat exchangers fixedly disposed at the radiator panel 13 correspond to the front rigid body of the present invention.

A front energy absorbing space 16a is formed between the radiator panel 13 and the bumper fascia 11, and an upper energy absorbing space 16b is formed between the upper frame (radiator panel upper) 13a of the radiator panel 13 and the front hood 3. The above-described bumper beam and the energy absorbing member (EA member) fixed to the front face of the bumper beam are disposed in the front energy absorbing space 16a.

In addition, an upper energy absorbing member (hereinafter referred to as an upper EA member) 21 as an energy absorbing member for pedestrian protection is disposed in the vehicle width direction near the upper space of the bumper fascia 11 where both energy absorbing spaces 16a and 16b intersect each other. As illustrated in FIGS. 5 to 9, the upper EA member 21 has a front wall member 22 as a front wall, a rear wall member 23 as a rear wall, and a partition member 24 as a partition. Each of the members 22 to 24 is made of a sheet metal obtained by processing a thin plate and is connected by spot welding.

As illustrated in FIGS. 1 to 5, the front wall member 22 is formed in a substantially Σ shape as a side view, and is disposed in the vehicle width direction along the inner surface of the bumper fascia 11. The front wall member 22 has an upper surface flange 22a and a lower surface flange 22b which face each other in parallel and extend rearward, and the rear end of the upper surface flange 22a is fixed to the lower surface of the step 11a of the bumper fascia 11 by a clip 26. The lower surface flange 22b is connected to the lower end of a front face 13b of the radiator panel upper 13a by spot welding or the like. The front face 13b of the radiator panel upper 13a extends downward longer than the rear face by a height h1. Lower air intake ports 13c are provided with predetermined intervals at the extended part of the front face 13b (see FIGS. 8 and 9). The lower surface flange 22b may be fixed to a lower portion of the front face of the radiator panel upper 13a via a fastening member such as a bolt. A reference symbol 13d indicates a radiator panel center which supports the center of the radiator panel 13 in the vehicle width direction.

At the front face of the front wall member 22, a recessed bend 22c is formed that bends in a direction to be away from the bumper fascia 11. The recessed bend 22c includes an upper inclined surface 22d which extends forward in an upward inclined direction, and a lower inclined surface 22e which extends forward in a downward inclined direction. Furthermore, in the front wall member 22, an upper projection 22f is formed at the upper end of the upper inclined surface 22d, and a lower projection 22g is formed at the lower end of the lower inclined surface 22e. Each of the projections 22f and 22g bends in a direction to be closer to the bumper fascia 11.

The lower projection 22g projects forward beyond the upper projection 22f, and both projections 22f and 22g are disposed near the inner surface of the bumper fascia 11. Consequently, when the front face of the vehicle slightly collides with an object A such as a vehicle or a utility pole (see FIG. 4), an impact energy is first transmitted to the lower projection 22g. The reference symbol B in FIG. 2 indicates a pedestrian's upper leg (around the thigh), and the reference symbol B' in FIG. 3 indicates the pedestrian's head.

The rear wall member 23 closes the space between the radiator panel upper 13a on the back of the front wall member 22, and the upper surface flange 22a. As illustrated in FIG. 1, an upper flange 23a, which is formed at the upper end of the rear wall member 23, is spot-welded to the underside of the upper surface flange 22a of the front wall member 22. In addition, a vertical wall surface 23b extends substantially perpendicularly from the upper flange 23a of the rear wall member 23, and an inclined surface 23c extends from the lower end of the vertical wall surface 23b toward the radiator panel upper 13a. Furthermore, a lower flange 23d, which is mounted on the radiator panel upper 13a, is formed at the lower end of the inclined surface 23c.

The boundary area between the vertical wall surface 23b and the inclined surface 23c is formed at a position lower than the boundary area between the upper projection 22f of the front wall member 22 and the recessed bend 22c by a predetermined height h2. In this example, the lower flange 23d is connected to the radiator panel upper 13a by spot welding or the like. However, the lower flange 23d may be connected to the radiator panel upper 13a via a fastening member such as a bolt.

In the upper EA member 21 according to this example, the front wall member 22, the rear wall member 23, and the radiator panel upper 13a form a BOX cross section (closed cross section). In addition, the inside of the upper EA member 21 is partitioned into an upper air passage 25a and a lower air passage 25b by a partition member 24. The air passages 25a and 25b each introduce air in front of the vehicle into the engine compartment 2, which will be described later.

The partition member 24 extends along the lower projection 22g of the recessed bend 22c, and the upper end thereof is spot-welded to the inner surface of the rear wall member 23 and the underside of the below-described pedestal 23f. The lower end of the partition member 24 is in contact with the lower inclined surface 22e of the front wall member 22. The lower end of the partition member 24 may be spot-welded to the lower inclined surface 22e. Whether the lower end of the partition member 24 is made to come into contact with or welded to the lower inclined surface 22e is determined according to the amount of reaction force generated in the upper EA member 21 at the time of a collision. Specifically, when a relatively high reaction force is needed, the lower end of the partition member 24 is welded to the lower inclined surface 22e; when a high reaction force is not needed, the lower end is only made to come into contact with the lower inclined surface 22e.

Figure 5:
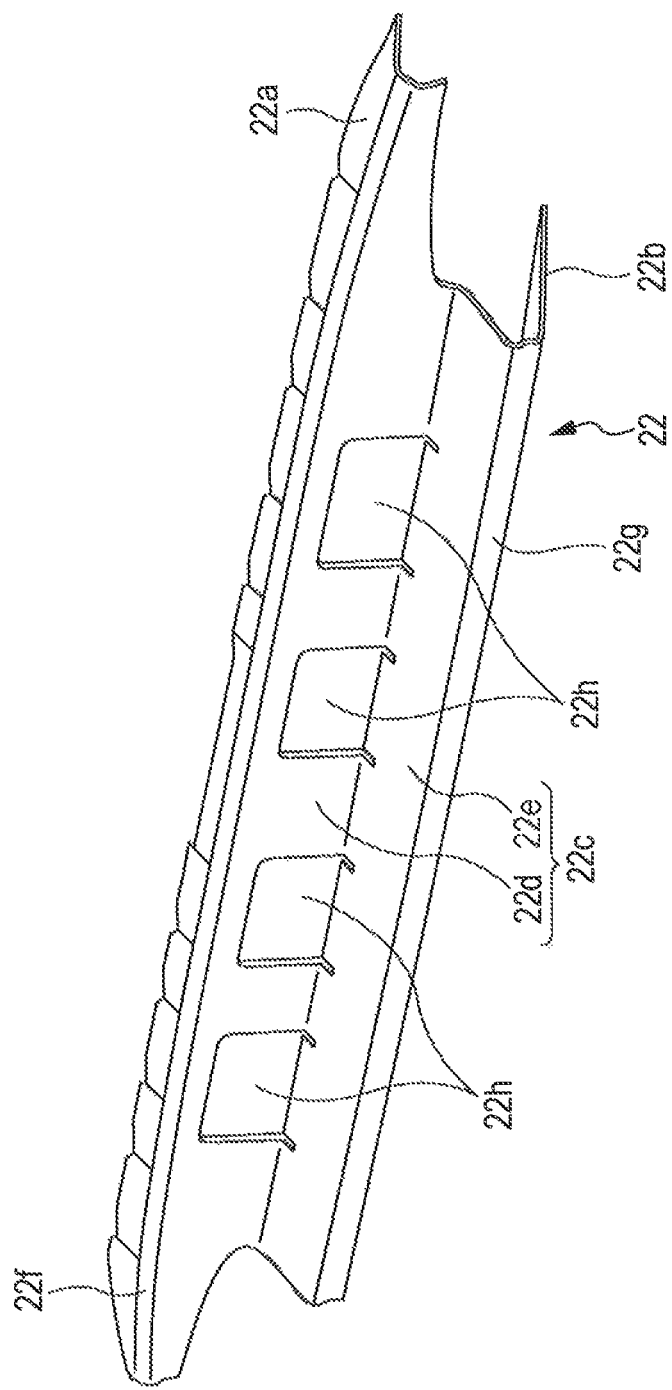
FIG. 5 is a perspective view of a front wall member of the upper energy absorbing member.
Figure 6:
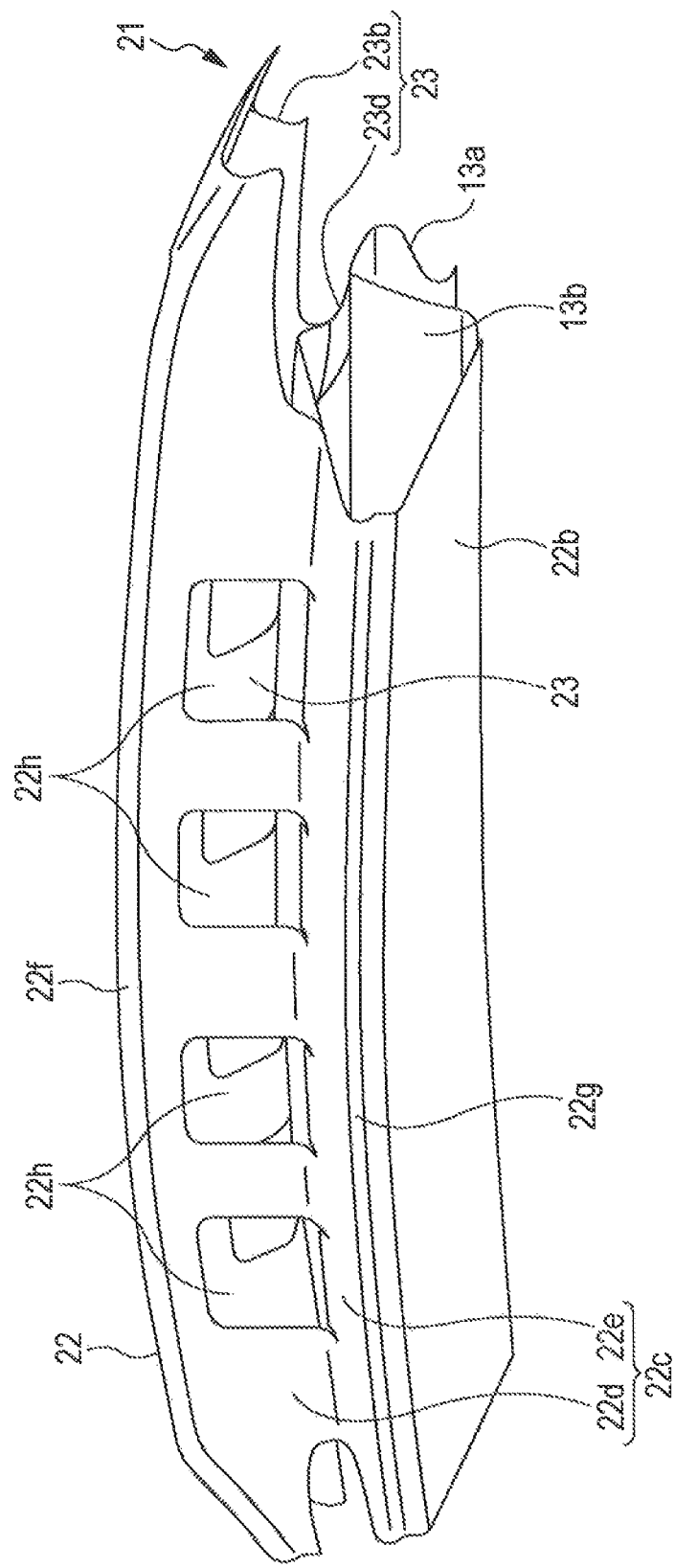
FIG. 6 is a perspective view of the upper energy absorbing member as seen from a front lower position.
Figure 7:
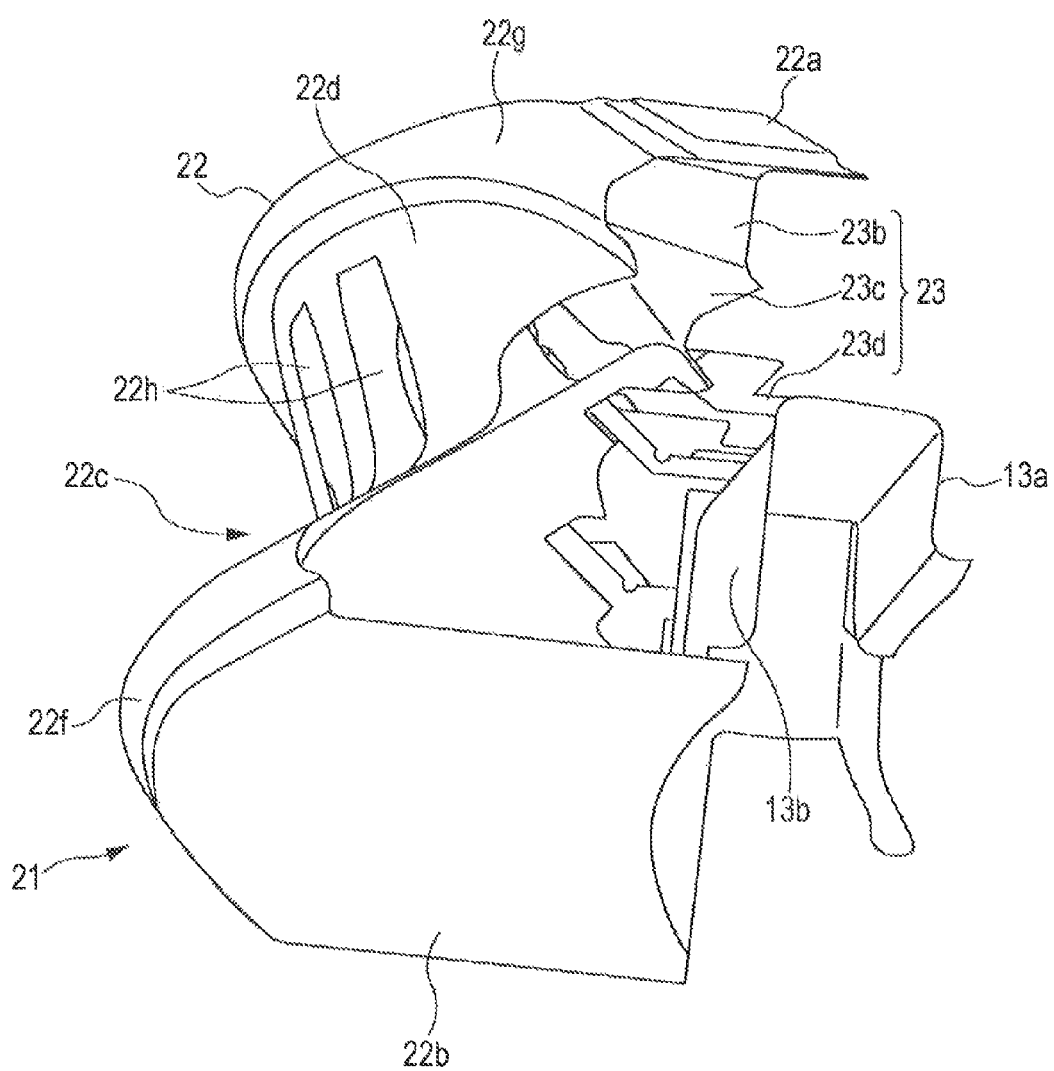
FIG. 7 is a perspective view of the upper energy absorbing member as seen from a side lower position.
Figure 8:
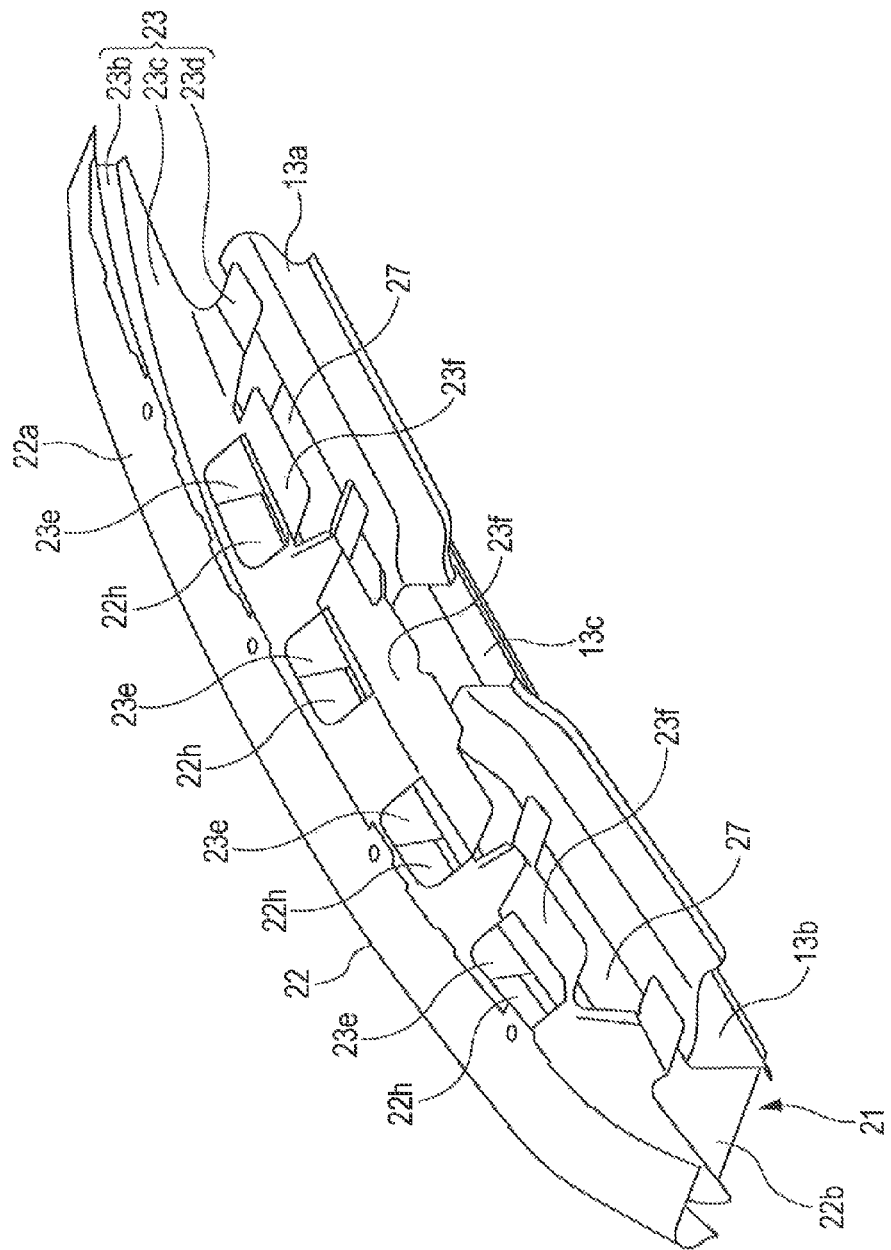
FIG. 8 is a perspective view of the upper energy absorbing member as seen from a rear lower position.
Figure 9:
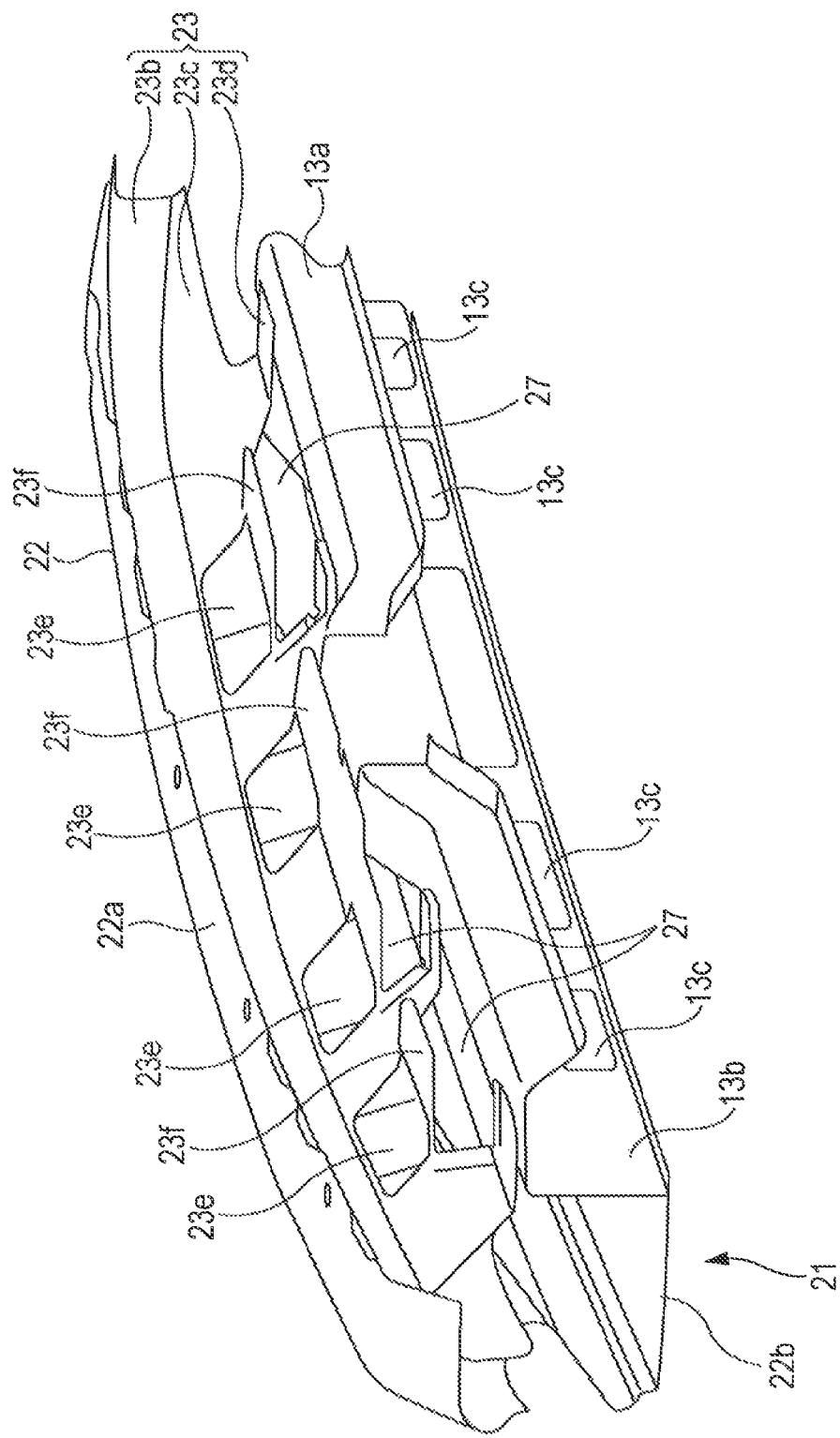
FIG. 9 is a rear perspective view of the upper energy absorbing member.

As illustrated in FIGS. 5 and 6, upper air intake ports 22h are provided with predetermined intervals in the vehicle width direction in the upper inclined surface 22d included in the recessed bend 22c of the front wall member 22. As illustrated in FIGS. 8 and 9, upper air outlet ports 23e are formed with predetermined intervals in the vehicle width direction in the rear wall member 23 which is exposed to the upper air passage 25a. In the rear wall member 23, the pedestals 23f are bent and formed substantially horizontally at the lower surface of the upper air outlet ports 23e. The pedestals 23f are each formed by cutting and raising upward part of the rear wall member 23, the part being spot-welded to the radiator panel upper 13a, and thus lower air outlet ports 27 are formed between the radiator panel upper 13a and the pedestals 23f by the cutting and raising of the pedestals 23f.

An inlet port for a cooling air duct (not illustrated) serving as a first duct is placed in the above-mentioned pedestals 23f and communicated with the upper air outlet ports 23e, the first duct supplying driving air as cooling air to an intercooler. The cooling air duct is formed in the rear surface of the front hood 3, and the inlet port for the duct is communicated with the upper air outlet ports 23e by closing the top of the engine compartment 2 with the front hood 3. In the radiator panel upper 13a, an air intake port of an intake duct as a second duct is placed and fixed to be communicated with the lower air outlet ports 27, the second duct being provided upstream of the air cleaner.

Next, the operation of the first example with the above configuration will be described.

[Normal Drive]

The upper EA member 21 is formed between the bumper fascia 11 and the radiator panel 13 and partitioned into the upper air passage 25a and the lower air passage 25b by the partition member 24. As illustrated in FIGS. 5 to 9, the upper air intake ports 22h and the upper air outlet ports 23e are respectively formed in the upper inclined surface 22d of the front wall member 22 and the inclined surface 23c of the rear wall member 23. The upper inclined surface 22d forms the front wall of the upper air passage 25a, and the inclined surface 23c forms the rear wall. The upper air outlet ports 23e are communicated with a cooling air inlet port for a duct (not illustrated) which supplies driving air (cooling air) to the intercooler.

When a vehicle runs, the driving air introduced from the front grille 12 flows into the upper air passage 25a through the upper air intake ports 22h, as indicated by the thick solid arrow in FIG. 1. The driving air is introduced to the upper air outlet ports 23e by the partition member 24, and is supplied from the upper air outlet ports 23e to the intercooler.

The lower air intake ports 13c are formed in the front face 13b of the radiator panel upper 13a which forms the rear wall of the lower air passage 25b. the lower air outlet ports 27 are formed in the inclined surface 23c of the rear wall member 23 (see FIGS. 8 and 9), the inclined surface 23c forming the rear upper wall, and the intake duct communicating with the air cleaner is communicated with the lower air outlet ports 27.

The intake air, which is to be supplied to the engine via the air cleaner, flows into the lower air passage 25b from the front grille 12 through the lower air intake ports 13c which are formed in the radiator panel upper 13a, and the intake air meanders through the lower air passage 25b and is sucked into the intake duct from the lower air outlet ports 27 as indicated by the thick solid arrow in FIG. 1. When the intake air, which is to be supplied to the engine, flows into the lower air passage 25b, the intake air meanders through the lower air passage 25b, and thus the raindrops, snowflakes contained in the intake air are separated.

In this manner, the upper EA member 21 according to this example serves as an air intake passage of the cooling air to be supplied to the intercooler as well as a labyrinth passage for separating raindrops, snowflakes or the like from the intake air to be supplied to the intake duct. Thus, disposition of the upper EA member 21 in front of the radiator panel upper 13a does not interfere with the supply of air to the intercooler and the engine.

[Leg Collision]

When a pedestrian's leg is made to come into contact with the vehicle front part 1, the upper part of the leg (around the thigh) B is made to come into contact with the bumper fascia 11 provided in the front bumper 10 of the vehicle front part 1, and/or with the front grille 12 mounted to the bumper fascia 11, and thus the bumper fascia 11 and the front grille 12 are pressed, so that a collision load is applied to the upper EA member 21 disposed rearward of the bumper fascia 11 and the front grille 12.

In the above process, the pedestrian's upper body is swung toward the front hood 3, and thus the front grille 12 and the bumper fascia 11 are crushed with the top of the upper leg B inclined to the direction of the vehicle body, so that a collision load is transmitted to the upper EA member 21.

As illustrated in FIG. 1, the front wall member 22 of the upper EA member 21 is formed in a substantially Σ shape, and the lower projection 22g projects forward beyond the upper projection 22f. Therefore, the collision load from the upper leg B is first applied to the lower projection 22g, and then applied to the upper projection 22f.

When the collision load is applied to the lower projection 22g, a moment load for expanding downward is generated in the lower inclined surface 22e because the lower inclined surface 22e, which is provided continuously to the lower projection 22g, extends forward in a downward inclined direction. On the other hand, when the impact load from the upper leg B is applied to the upper projection 22f, a moment load for expanding upward is generated in the upper inclined surface 22d because the projection 22f is crushed, and the upper inclined surface 22d, which is provided continuously to continuously to the projection 22f, extends forward in an upward inclined direction. When the collision load from the upper leg B is applied to the members 22 to 24, they are bent and deformed in the vehicle width direction because the members 22 to 24 included in the upper EA member 21 each have a certain degree of rigidity.

Figure 2:
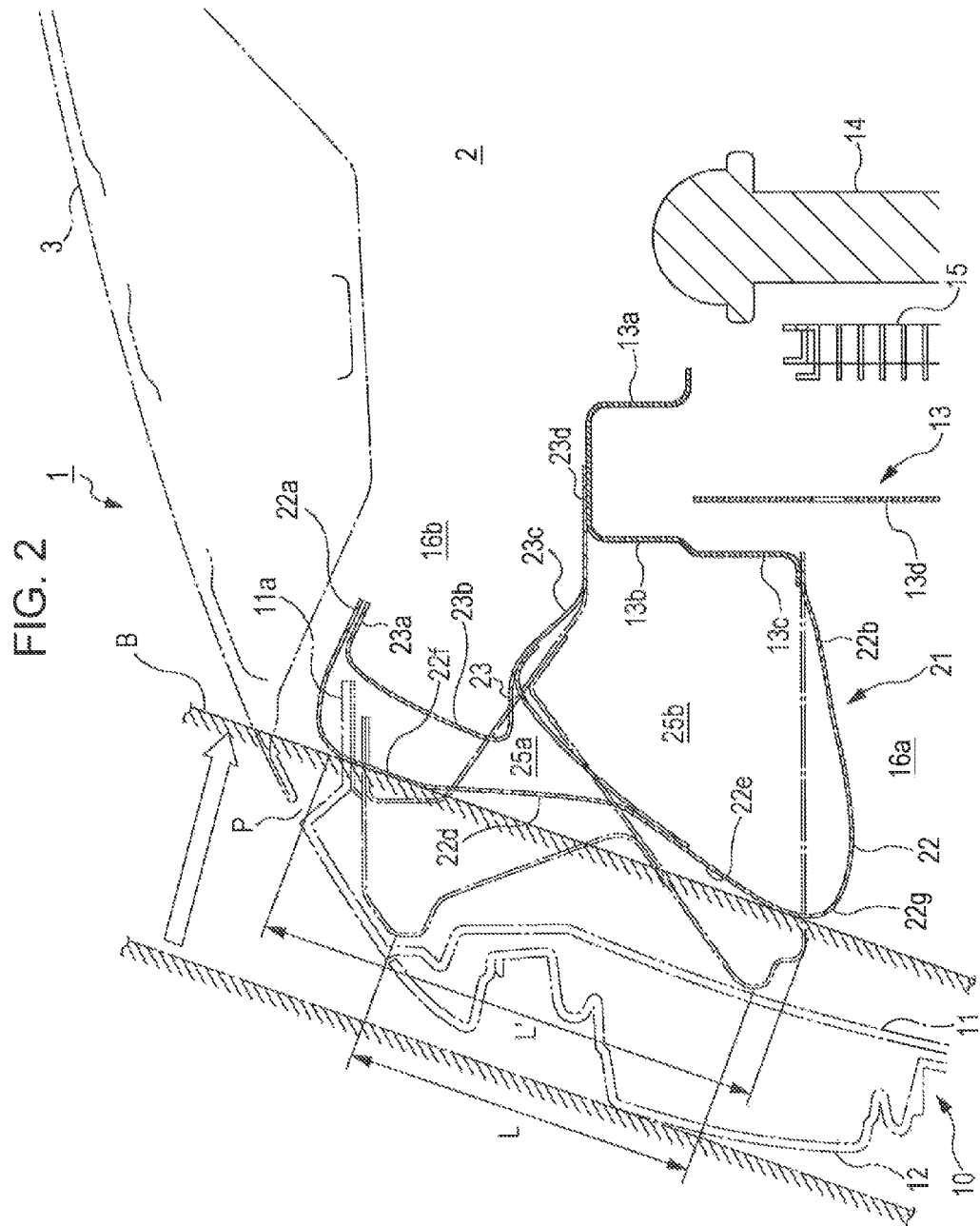
FIG. 2 is a cross-sectional side view corresponding to FIG. 1 and illustrating the behavior of an upper energy absorbing member according to the first example when a frontal collision with a pedestrian occurs.

Consequently, as illustrated in FIG. 2, the lower inclined surface 22e is expanded and deformed downward, the upper inclined surface 22d is expanded and deformed upward, and thus upward and downward deformation of the inclined surfaces 22d and 22e causes the original span L between the upper projection 22f and the lower projection 22g to be increased to the span L'. At the same time, the bending angle between the inclined surfaces 22d and 22e becomes closer to a line angle (180 degrees), and thus the inclined surfaces 22d and 22e receive the impact load from the upper leg B as a large surface load (uniformly distributed load). As a result, the impact energy from the upper leg B is efficiently absorbed by the deformation of the inclined surfaces 22d and 22e in the expanding direction, and the rearward movement of the inclined surfaces 22d and 22e associated with the deformation.

In addition, in the upper EA member 21, the front wall member 22, the rear wall member 23, and the radiator panel upper 13a form the BOX cross section (closed cross section). Accordingly to the deformation of the front wall member 22, the rear wall member 23 is also deformed with supported by the radiator panel upper 13a, and thus the impact energy from the upper leg B is absorbed more efficiently by the front wall member 22 and the rear wall member 23 which are made of thin sheet metal.

Therefore, a load displacement characteristic that indicates the relationship between the impact load and the amount of displacement (amount of deformation) of the upper EA member 21 becomes closer to an ideal rectangle wave with which a high impact load can be absorbed by a small deformation stroke. Thus, the impact energy can be absorbed more efficiently. Furthermore, the backward movement of the upper projection 22f causes the end of the front hood 3 to be pressed and deformed, and thus the impact energy is also absorbed by the deformation of the front hood 3.

In example, the lower end of the partition member 24 is only in contact with the lower inclined surface 22e, and thus the partition member 24 does not significantly affect to the reaction force generated when the inclined surfaces 22d, 22e are expanded and deformed. However, when the partition member 24 is spot-welded to the lower inclined surface 22e, and the plate thickness is set appropriately, the reaction force of the lower inclined surface 22e can be adjusted.

[Head Collision]

Figure 3:
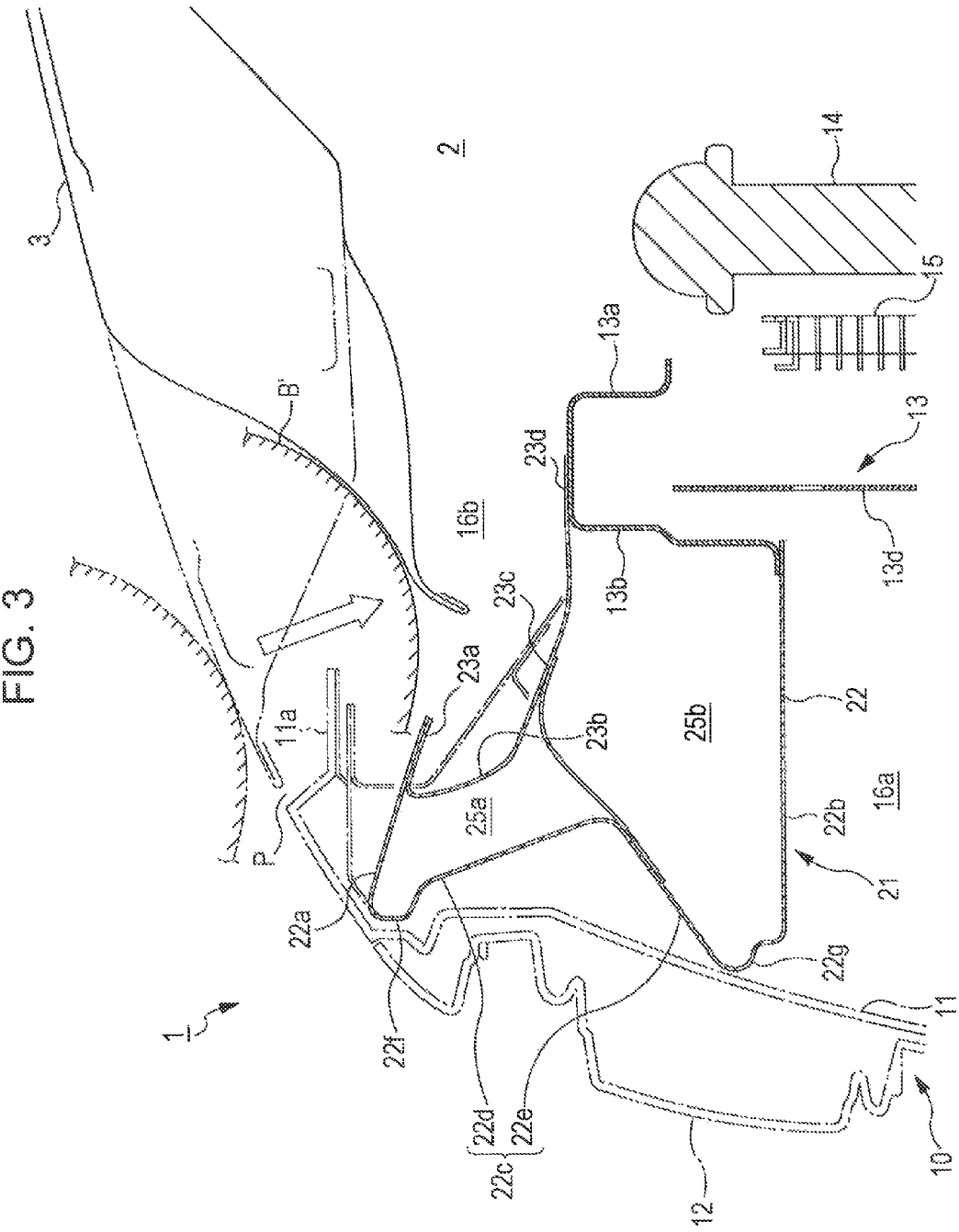
FIG. 3 is a cross-sectional side view corresponding to FIG. 1 and illustrating the behavior of the upper energy absorbing member when a collision with the pedestrian's head occurs.

As illustrated in FIG. 3, when a pedestrian's head B' falls near the boundary P between the end of the front hood 3 and the bumper fascia 11, the end of the front hood 3 and the step 11a formed at the upper end of the bumper fascia 11 are bent down and deformed. Then, the vicinity of the rear end of the upper surface flange 22a of the upper EA member 21, the flange 22a being fixed to the underside of the step 11, is likely to be bent down and deformed.

The upper flange 23a of the rear wall member 23 is spot-welded to the underside of the upper surface flange 22a, and the upper flange 23a is bent backward from the upper end of the vertical wall surface 23b continuous to the inclined surface 23c. Therefore, when a pressing force from the upper flange 23a is applied to the vertical wall surface 23b, the inclined surface 23c is deformed in a recessed shape toward the upper air passage 25a around the lower flange 23d which is fixed to the radiator panel upper 13a.

As a result, the upper surface flange 22a, which is formed in the front wall member 22 of the upper EA member 21, and the upper flange 23a and the inclined surface 23c, which are formed in the rear wall member 23, are moved back to a position where interfere with the deformation locus of the front hood 3 does not occur, and thus the deformation stroke of the front hood 3 in the upper energy absorbing space 16b is ensured.

Therefore, even when the pedestrian's head B' falls on the vicinity of the boundary P, the absorption of the impact energy is not prevented by the reaction force (counterforce) of the upper EA member 21, and the impact energy can be efficiently absorbed by the deformation stroke of the front hood 3. Consequently, the head injury criterion (HIC) can be reduced.

[Light Collision]

Figure 4:
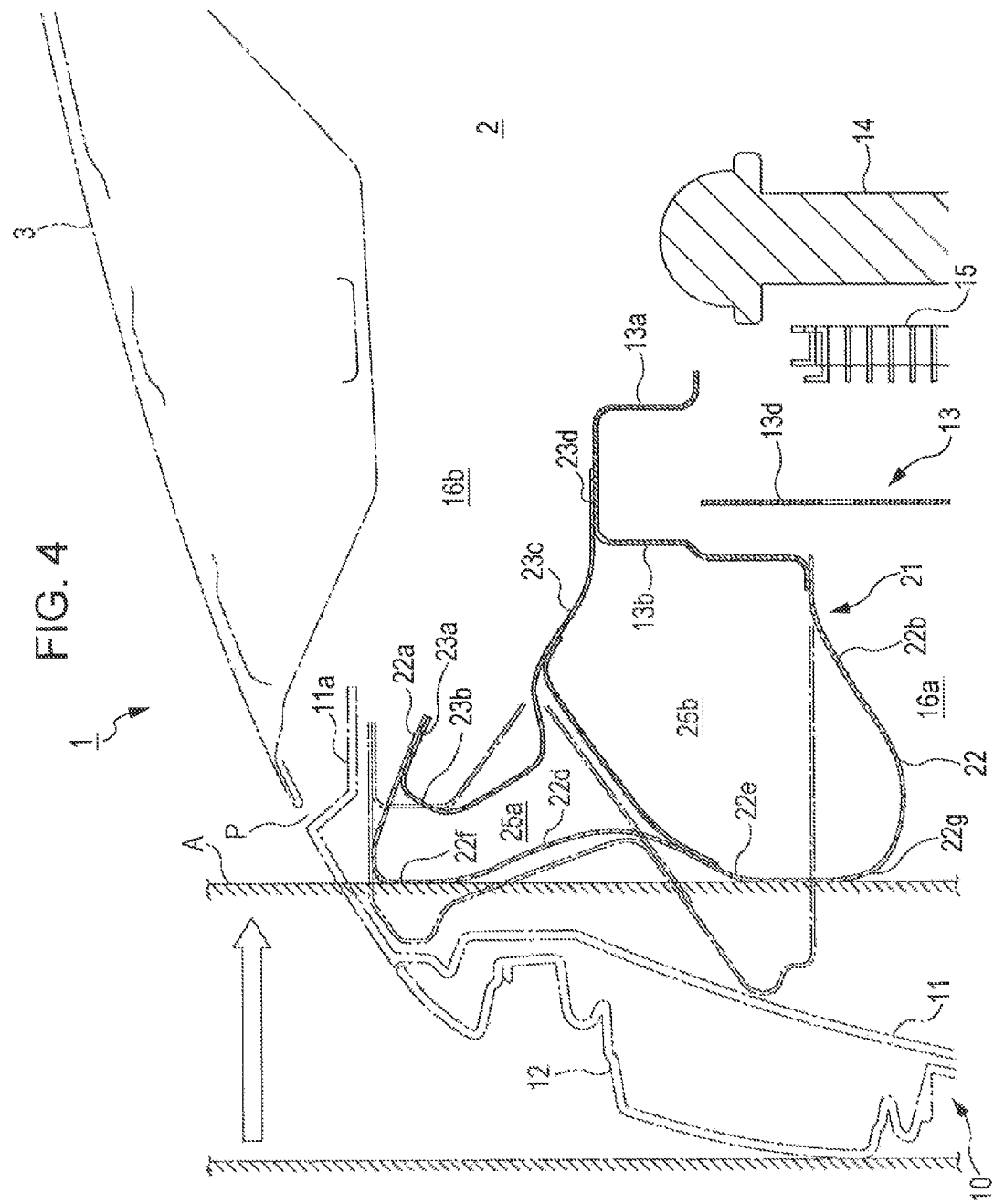
FIG. 4 is a cross-sectional side view corresponding to FIG. 1 and illustrating the behavior of the upper energy absorbing member when a light collision occurs.

As illustrated in FIG. 4, when a collision (light front collision) of the vehicle front part 1 occurs with an object A such as a vehicle or a utility pole at a low speed that does not cause the bumper beam (not illustrated) to be deformed, the impact energy is absorbed by the deformation of the energy absorbing member (EA member) which is fixed to the front face of the bumper beam (not illustrated). As illustrated in FIG. 4, the object A is stopped before the front hood 3.

In the above process, the impact load of the object A is also transmitted to the upper EA member 21. If the upper HA member 21 is moved back in response to the impact load from the object A, parts such as the front hood 3 and the radiator panel upper 13a which are disposed rearward of the upper EA member 21 are damaged. Thus, in this example, damage to those parts is prevented by significantly bulging and deforming the upper EA member 21 downward.

Specifically, in the upper EA member 21, the front wall member 22, the rear wall member 23, and the radiator panel upper 13a which has a high rigidity form a BOX cross section (closed cross section). Therefore, when the lower projection 22g is pressed by the object A, the lower projection 22g is pressed backward, and the lower inclined surface 22e and the lower surface flange 22b are bent and deformed so as to bulge downward, while the radiator panel upper 13a is not be deformed, When the upper projection 22f is pressed by the object A, the bend between the upper inclined surface 22d and the upper projection 22f is likely to be expanded and deformed upward. When the upper projection 22f is deformed upward, the rear end of the upper surface flange 22a, which is formed continuously to the upper projection 22f, is inclined downward, and thus the vertical wall surface 23b of the rear wall member 23 is, pressed downward.

As illustrated in FIG. 1, the bend between the vertical wall surface 23b and the inclined surface 23c of the rear wall member 23 is formed at a position lower by a predetermined height h2 than the bend between the upper inclined surface 22d and the upper projection 22f of the front wall member 22. Thus, when the vertical wall surface 23b is pressed downward, the bend between the vertical wall surface 23b and the inclined surface 23c is recessed and deformed to the upper air passage 25a so that the upper surface flange 22a is allowed to he inclined downward. Thus, even when the upper projection 22f is pressed by the object A, the upper surface flange 22a and the inclined surface 23c of the rear wall member 23 do not project rearward, and thus interference with the front hood 3 is avoided and damage is prevented.

Furthermore, the upper EA member 21 forms the BOX cross section by fixing the front wall member 22 and the rear wall member 23 to the radiator panel upper 13a, and thus reduction in the number of components allows simplification of structure, reduced weight, and reduction in the manufacturing cost to be achieved.

In this example, the lower end of the partition member 24 is made to come into contact with the lower inclined surface 22e of the front wall member 22. However, when the reaction force at the time of collision is insufficient, the lower end is spot-welded to the lower inclined surface 22e. Accordingly, the reaction force can be adjusted by appropriately selecting the material quality, the plate thickness of the partition member 24.

SECOND EXAMPLE

Figure 10:
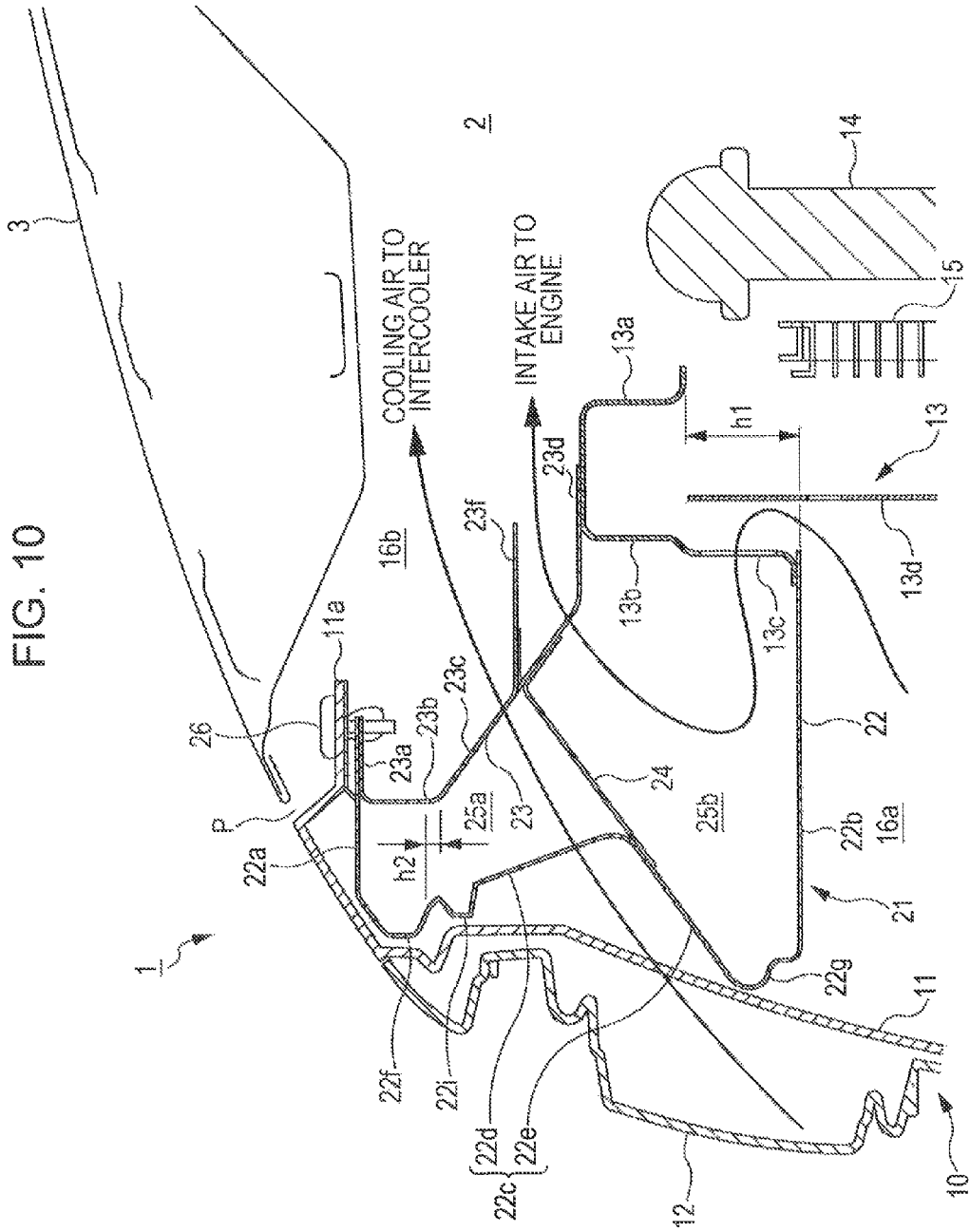
FIG. 10 is a cross-sectional view corresponding to FIG. 1 according to a second example.

FIG. 10 illustrates a second example of the present invention. The same components as those in the above-described first, example are labeled with the same reference symbols, and descriptions thereof are omitted.

In this example, forwardly projecting beads 22i are formed with predetermined intervals in the vehicle width direction between the upper projection 22f and the upper inclined, surface 22d of the front wall member 22 which is disposed in the upper EA member 21.

Because the beads 22i are formed with predetermined intervals in the vehicle width direction in this example, when the pedestrian's upper leg B or the object A collides with the vehicle and an impact load is applied to the upper projection 22f, the impact load can be also received by the beads 22i. Therefore, the front face of the upper projection 22f is difficult to be crushed, and accordingly, the upper projection 22f can be reliably deformed upward.

The present invention is not limited to the above-described examples. For instance, by forming the upper surface flange 22a in the front wall member 22 of the upper EA member 21, and the upper flange 23a in the rear wall member 23 using a folding process, both wall members 22 and 23 can be formed from a single plate material. When the front all member 22 and the rear wall member 23 of the upper EA member 21 are formed with different members, both wall members 22 and 23 may be formed with different material qualities or plate thicknesses. The reaction force in relation to a collision may be adjusted by appropriately setting the material qualities or plate thicknesses of the both wall members 22 and 23.

The invention claimed is:
1. A vehicle front structure comprising:
a bumper fascia;
a front rigid body disposed in a vehicle width direction behind the bumper fascia; and
an energy absorbing member for pedestrian protection which is placed upward between the bumper fascia and the front rigid body in the vehicle width direction, the energy absorbing member for pedestrian protection having a rear fixed to the front rigid body,
wherein a bend is formed in the vehicle width direction on a front wall of the energy absorbing member for pedestrian protection, the front wall facing the bumper fascia, the bend having a recessed shape in a vertical direction with an upper projection and a lower projection, respectively above and below the bend, that project in a direction toward the bumper fascia;
wherein the energy absorbing member for pedestrian protection has the front wall and a rear wall disposed behind the front wall;
wherein an upper end of the bumper fascia is fixed to an upper surface flange that extends rearward from an upper end of the upper projection; and
wherein the rear wall has a vertical wall surface that extends downward from the upper surface flange, and an inclined surface that extends rearward from the vertical wall surface in a downward inclined direction, and a lower end of the inclined surface is fixed to an upper surface of the front rigid body.

2. The vehicle front structure according to claim 1, wherein the lower projection projects toward the bumper fascia beyond the upper projection.

3. The vehicle front structure according to claim 2, wherein an upper end of the rear wall is provided continuously to a first position of the upper surface flange forward of a second position of the upper surface flange at which the upper end of the bumper fascia is fixed.

4. The vehicle front structure according to claim 2, wherein a boundary area between the vertical wall surface of the rear wall and the inclined surface is set at a position lower than a boundary area between the upper projection and the bend.

5. The vehicle front structure according to claim 2, wherein
a lower surface flange that extends rearward from a lower end of the lower projection of the energy absorbing member for pedestrian protection is fixed to the front rigid body, and
the front wall, the rear wall, and the front rigid body form a closed cross section, and an air passage for introducing air in front of a vehicle into an engine compartment is internally formed.

6. The vehicle front structure according to claim 5, wherein
the air passage is partitioned into an upper air passage and a lower air passage by a partition;
an upper air intake port and an upper air outlet port are respectively formed in the front wall and the rear wall which are exposed to the upper air passage; and
the upper air outlet port is communicated with a first air duct.

7. The vehicle front structure according to claim 6, wherein
a lower air intake port and a lower air outlet port are respectively formed in the front rigid body and the rear wall which are exposed to the lower air passage; and
the lower air outlet port is communicated with a second air duct.

8. The vehicle front structure according to claim 7, wherein the lower air outlet port is formed above the lower air intake port.

9. The vehicle front structure according to claim 1, wherein an upper end of the rear wall is provided continuously to a first position of the upper surface flange forward of a second position of the upper surface flange at which the upper end of the bumper fascia is fixed.

10. The vehicle front structure according to claim 1, wherein a boundary area between the vertical wall surface of the rear wall and the inclined surface is set at a position lower than a boundary area between the upper projection and the bend.

11. The vehicle front structure according to claim 1, wherein
a lower surface flange that extends rearward from a lower end of the lower projection of the energy absorbing member for pedestrian protection is fixed to the front rigid body, and
the front wall, the rear wall, and the front rigid body form a closed cross section, and an air passage for introducing air in front of a vehicle into an engine compartment is internally formed.

12. The vehicle front structure according to claim 11, wherein
the air passage is partitioned into an upper air passage and a lower air passage by a partition;
an upper air intake port and an upper air outlet port are respectively formed in the front wall and the rear wall which are exposed to the upper air passage; and
the upper air outlet port is communicated with a first air duct.

13. The vehicle front structure according to claim 12, wherein
a lower air intake port and a lower air outlet port are respectively formed in the front rigid body and the rear wall which are exposed to the lower air passage; and
the lower air outlet port is communicated with a second air duct.

14. The vehicle front structure according to claim 13, wherein the lower air outlet port is formed above the lower air intake port.

15. A vehicle front structure comprising;
a bumper fascia;
a front rigid body disposed in a vehicle width direction behind the bumper fascia; and
an energy absorbing member for pedestrian protection which is placed upward between the bumper fascia and the front rigid body in the vehicle width direction, the energy absorbing member for pedestrian protection having a rear fixed to the front rigid body,
wherein a bend is formed in the vehicle width direction on a front wall of the energy absorbing member for pedestrian protection, the front wall facing the bumper fascia, the bend having a recessed shape in a vertical direction with an upper projection and a lower projection, respectively above and below the bend, that project in a direction toward the bumper fascia;
wherein the energy absorbing member for pedestrian, protection has the front wall and a rear wall disposed behind the front wall;
wherein an upper end of the bumper fascia is fixed to an upper surface flange that extends rearward from an upper end of the upper projection;
wherein a lower surface flange that extends rearward from a lower end of the lower projection of the energy absorbing member for pedestrian protection is fixed to the front rigid body;
wherein the front wall, the rear wall, and the front rigid body form a closed cross section, and an air passage for introducing air in front of a vehicle into an engine compartment is internally formed;
wherein the air passage is partitioned into an upper air passage and a lower air passage by a partition;
wherein an upper air intake port and an upper air outlet port are respectively formed in the front wall and the rear wall which are exposed to the upper air passage; and
wherein the upper air outlet port is communicated with a first air duct.

16. The vehicle front structure according to claim 15, wherein
a lower air intake port and a lower air outlet port are respectively formed in the front rigid body and the rear wall which are exposed to the lower air passage; and
the lower air outlet port is communicated with a second air duct.

17. The vehicle front structure according to claim 16, wherein the lower air outlet port is formed above the lower air intake port.

18. A vehicle front structure comprising:
a bumper fascia;
a front rigid body disposed in a vehicle width direction behind the bumper fascia; and
an energy absorbing member for pedestrian protection which is placed upward between the bumper fascia and the front rigid body in the vehicle width direction, the energy absorbing member for pedestrian protection having a rear fixed to the front rigid body,
wherein a bend is formed in the vehicle width direction on a front wall of the energy absorbing member for pedestrian protection, the front wall facing the bumper fascia, the bend having a recessed shape in a vertical direction with an upper projection and a lower projection, respectively above and below the bend, that project in a direction toward the bumper fascia;
wherein the energy absorbing member for pedestrian protection has the front wall and a rear wall disposed behind the front wall;
wherein an upper end of the bumper fascia is fixed to an upper surface flange that extends rearward from an upper end of the upper projection;
wherein the lower projection projects toward the bumper fascia beyond the upper projection;
wherein a lower surface flange that extends rearward from a lower end of the lower projection of the energy absorbing member for pedestrian protection is fixed to the front rigid body;
wherein the front wall, the rear wall, and the front rigid body form a closed cross section, and an air passage for introducing air in front of a vehicle into an engine compartment is internally formed;
wherein the air passage is partitioned into an upper air passage and a lower air passage by a partition;
wherein an upper air intake port and an upper air outlet port are respectively formed in the front wall and the rear wall which are exposed to the upper air passage; and
wherein the upper air outlet port is communicated with a first air duct.

19. The vehicle front structure according to claim 18, wherein
a lower air intake port and a lower air outlet port are respectively formed in the front rigid body and the rear wall which are exposed to the lower air passage; and
the lower air outlet port is communicated with a second air duct.

20. The vehicle front structure according to claim 19, wherein the lower air outlet port is formed above the lower air intake port.

* * * * *